US008154159B2

(12) United States Patent
Sakai et al.

(10) Patent No.: US 8,154,159 B2
(45) Date of Patent: Apr. 10, 2012

(54) ELECTRIC MOTOR

(75) Inventors: Joji Sakai, Kyoto (JP); Yukihiko Nakagami, Kikugawa (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 330 days.

(21) Appl. No.: 12/535,894

(22) Filed: Aug. 5, 2009

(65) Prior Publication Data

US 2010/0033039 A1 Feb. 11, 2010

(30) Foreign Application Priority Data

Aug. 6, 2008 (JP) ................ P2008-202530

(51) Int. Cl.
*H02K 9/19* (2006.01)
(52) U.S. Cl. ........................... 310/54; 310/89
(58) Field of Classification Search .............. 310/54, 310/87–89
See application file for complete search history.

(56) References Cited

U.S. PATENT DOCUMENTS

| | | | | |
|---|---|---|---|---|
| 5,448,118 | A * | 9/1995 | Nakamura et al. | 310/54 |
| 5,623,175 | A * | 4/1997 | Ronning et al. | 310/54 |
| 7,569,955 | B2 * | 8/2009 | Hassett et al. | 310/54 |
| 7,576,458 | B2 * | 8/2009 | Wehner et al. | 310/54 |
| 2002/0189785 | A1 | 12/2002 | Isaac et al. | |
| 2004/0066100 | A1 | 4/2004 | Vlemmings et al. | |
| 2006/0125333 | A1 * | 6/2006 | Wehner et al. | 310/54 |
| 2008/0284263 | A1 * | 11/2008 | Dessirier | 310/54 |
| 2009/0079278 | A1 * | 3/2009 | Kramer et al. | 310/54 |
| 2010/0013330 | A1 | 1/2010 | Rodriguez et al. | |
| 2010/0164310 | A1 * | 7/2010 | Dames et al. | 310/54 |

FOREIGN PATENT DOCUMENTS

| | | |
|---|---|---|
| CN | 1540837 A | 10/2004 |
| DE | 10117373 A1 | 10/2002 |
| DE | 10232648 A1 | 2/2003 |
| DE | 102008014386 A1 | 9/2008 |
| DE | 102007055910 A1 | 4/2009 |
| JP | 8-19218 A | 1/1996 |
| WO | WO 2008/009774 A1 | 1/2008 |

OTHER PUBLICATIONS

Chinese Office Action dated Mar. 10, 2011.

* cited by examiner

*Primary Examiner* — Quyen Leung
*Assistant Examiner* — Naishadh Desai
(74) *Attorney, Agent, or Firm* — Birch, Stewart, Kolasch & Birch, LLP

(57) ABSTRACT

An electric motor for use in an electric vehicle, the electric motor includes: an inner housing which holds a stator; and an outer housing which defines a space through which cooling water is caused to flow between the inner housing and itself. The inner housing and the outer housing are connected by a plurality of columns disposed in the space.

4 Claims, 6 Drawing Sheets

ELECTRIC MOTOR

BACKGROUND OF THE INVENTION

1. Field of the Invention

The present invention relates to an electric motor for use in an electric vehicle.

2. Description of the Related Art

As the global warming issue is becoming more serious, more attention is paid to electric vehicles which provide less environmental load, and various technologies have been proposed as elementary technologies of electric vehicles. For example, in electric motors (hereinafter, referred to as a motor) for use in electric vehicles, a water-cooled motor has been proposed in which a cooling water jacket is provided on an outer circumference of a stator for circulation of cooling water for cooling the motor in order to maintain the temperature in the interior of a motor in operation to a permissible value.

As a construction of a cooling water jacket in a water-cooled motor, there has been proposed a construction in which a space between an inner housing into which a stator is inserted and an outer housing which configures a cooling water jacket is completely hollowed in order to ensure a required cooling capability. In addition, there has also been proposed a cooling water jacket construction for increasing further the cooling effect in which radiation fins are provided in a hollow portion in a cooling jacket while considering a flow of cooling water (refer to JP-A-8-19218).

The operation speed of motors for electric vehicles reaches about 10000 rpm in an attempt to obtain a highly efficient area. As this occurs, a high-frequency vibratory force by an electromagnetic force is applied to a stator, whereby an inner housing portion which holds the stator is caused to vibrate, and the whole of a motor case is vibrated by micro-amplitude high frequency waves, high-frequency vibration noise of several kHz being thereby generated. However, the motor in which the cooling water jacket is completely hollowed originally has difficulty in increasing the rigidity thereof, and in the event that a high-frequency vibratory force is applied to stator, the structural rigidity of the motor case is insufficient for the rigidity required for motor cases. In addition, in the case of the motor described in JP-A-8-19218 in which the radiation fins are provided in the hollow portion provided as the cooling water jacket and the inner housing portion and the outer housing portion are connected together by part of the radiation fins, since the radiating effect cannot be obtained when the radiation fins are made thick, the inner housing and the outer housing are connected together by thin plate-like members. Consequently, in the event that a high-frequency vibratory force is applied to the stator, the structural rigidity of the motor case is still insufficient for the structural rigidity required for motor cases, and the reduction in vibration noise level has still been difficult. Further, when an inner housing and an outer housing are connected together by radiation fins, in the event that a hollow portion residing between the inner housing and the outer housing is not increased, it becomes difficult to discharge core sand which is used as a core to form the hollow portion. Consequently, when attempting to connect the inner housing and the outer housing together by the radiation fins, there has been caused a problem that the external shape of the motor itself has to be enlarged. In this way, in the field of motors for electric vehicles, with a view to suppressing vibrations without enlarging the external shape of a motor, an increase in structural rigidity, in particular, an increase in rigidity of an inner housing which holds a stator has been desired.

SUMMARY OF THE INVENTION

It is therefore an object of the invention to provide an electric motor which can increase rigidity thereof and cooling efficiency.

In order to achieve the object, according to the invention, there is provided an electric motor for use in an electric vehicle, the electric motor comprising:

an inner housing which holds a stator; and an outer housing which defines a space through which cooling water is caused to flow between the inner housing and itself, wherein the inner housing and the outer housing are connected by a plurality of columns disposed in the space.

A plurality of first ribs which extend in an axial direction and a plurality of second ribs which extend in a circumferential direction may be provided on an outer circumferential surface of the outer housing. At least first one of the plurality of columns may be disposed in a position which corresponds to one of the plurality of first ribs and the plurality of second ribs.

At least second one of the plurality of columns may be disposed in a position which corresponds to a center of a portion surrounded by the plurality of first ribs and the plurality of second ribs.

The portion surrounded by the plurality of first ribs and the plurality of second ribs may have an area which can generate membrane vibration.

BRIEF DESCRIPTION OF THE DRAWINGS

FIG. 1A is a radial sectional view of the electric motor and FIG. 1B is an axial sectional view of the same motor.

FIG. 2A is an external view of the electric motor shown in FIG. 1A as viewed from thereabove and FIG. 2B is an external view of the same motor as viewed from therebelow.

FIG. 3A is an external view of the electric motor as viewed from the left and FIG. 3B is an external view of the same motor as viewed from the right.

DETAILED DESCRIPTION OF THE INVENTION

Hereinafter, using FIGS. 1A to 5, an embodiment of an electric motor according to the invention will be described in detail. Note that the electric motor according to the invention is suitable for use in electric vehicles.

Figure 1A:
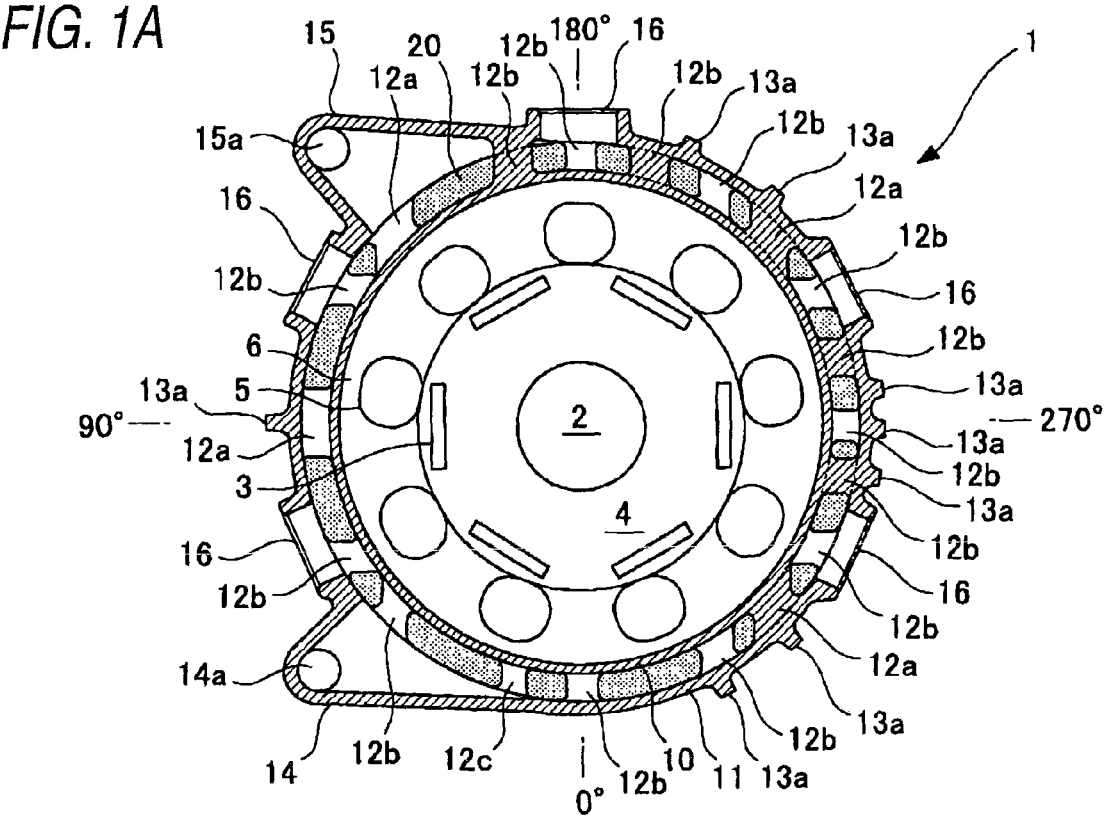
FIGS. 1A and 1B are diagrams showing an embodiment of an electric motor according to the invention.
Figure 1B:
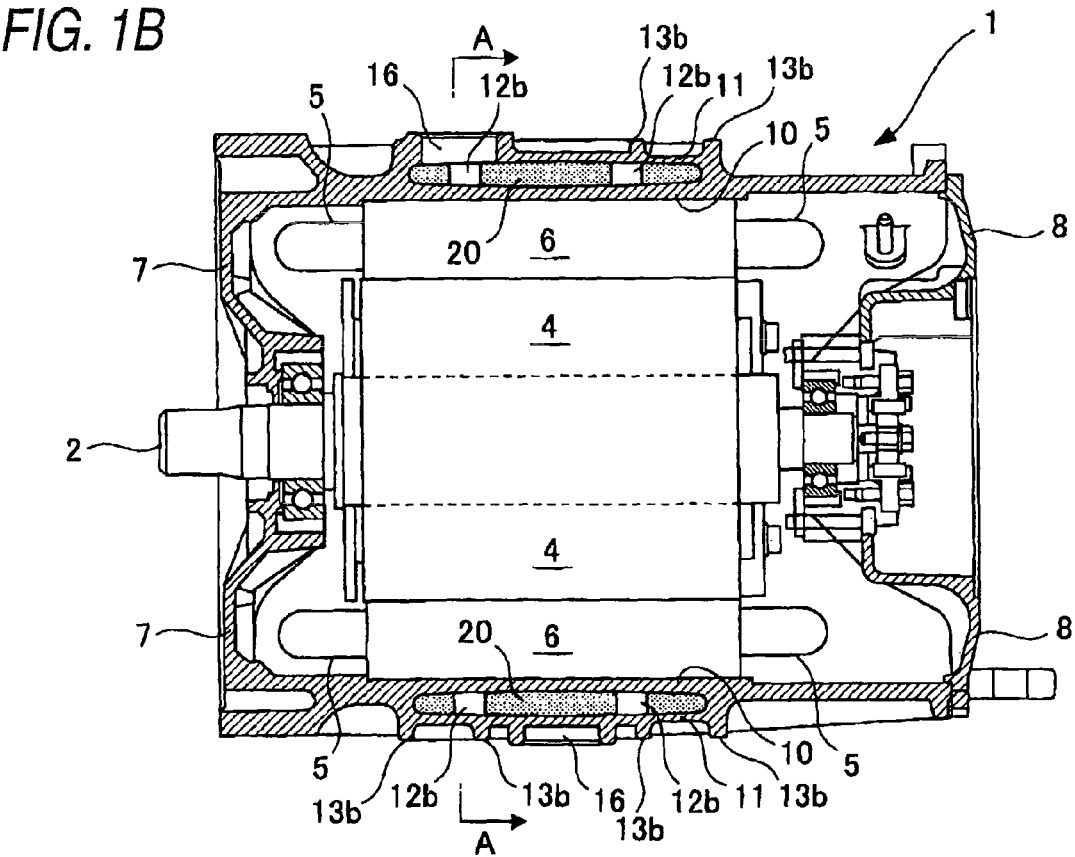

FIGS. 1A and 1B are diagrams showing an embodiment of an electric motor according to the invention, FIG. 1A is a radial sectional view of the electric motor and FIG. 1B is an axial sectional view of the same motor. Firstly, the configuration of the electric motor according to the invention will schematically be described by the use of FIGS. 1A and 1B.

As is shown in FIGS. 1A and 1B, an electric motor (motor) 1 of this embodiment has a shaft 2 which is a rotational shaft, a rotor 4 which is supported concentrically on the shaft 2 and which has a plurality of permanent magnets 3 and a cylindrical stator 6 which is disposed on a circumference of the rotor 4 with an appropriate space held between the rotor 4 and itself and which has a plurality of coils 5. The electric motor 1 is constructed in such a manner that the stator 6 is held inside an inner housing 10 and the shaft 2 and the rotor 4 are supported together with bearings by brackets 7, 8 which are disposed at both end portions of the inner housing 10.

In addition, an outer housing 11 is provided on an outer circumferential side of the inner housing in such a manner as to define the inner housing 10 and itself a space through which cooling water is caused to flow. This is a construction which is a so-called cooling water jacket. In the motor 1 of the embodiment, a space between the inner housing 10 and the outer housing 11 is not hollowed completely, but, as is shown in FIGS. 1A and 1B, the inner housing 10 and the outer housing 11 are connected together by a large number of columns 12a, 12b, 12c which are disposed in this apace. A flow path 20 (refer to portions shaded with dots) through which cooling water flows is formed by the inner housing 10, the outer housing 11 and columns 12a, 12b, 12c. In addition, the columns 12a, 12b, 12c are not thin elongated columns like radiation fins but are each formed into a circular cylindrical shape. Note that while the circular cylindrical columns are depicted as an example in this embodiment, for example, an oval cylinder, a triangular prism, a quadrangular prism, a polygonal prism, a prism having a star-shape cross section and the like may be used as the columns.

In addition, in order to increase rigidity and prevent the occurrence of membrane vibrations, a plurality of axial ribs 13a and a plurality of circumferential ribs 13b are provide in axial direction and a circumferential direction, respectively, on an outer circumferential surface of the outer housing 11.

Additionally, an inlet portion 14 and an outlet portion 15 for cooling water are provided in such a manner as to project in a tent-like fashion from the outer circumferential surface of the outer housing 11, and an inlet port 14a and an outlet port 15a are provided in the inlet portion 14 and the outlet portion 15, respectively, so as to supply and discharge cooling water into and from the flow path 20.

In addition, a plurality of sand removal holes 16 are provided. These sand removal holes 16 are for removing sand which is used as a core after casting and are thereafter sealed with lids.

Here, referring also to FIGS. 2A to 5, the flow path 20 will be described. Note that for easy comparison of the drawings including FIGS. 1A and 1B, angles are also shown on the drawings which are measured from a bottom portion of the motor as 0°.

Figure 2A:
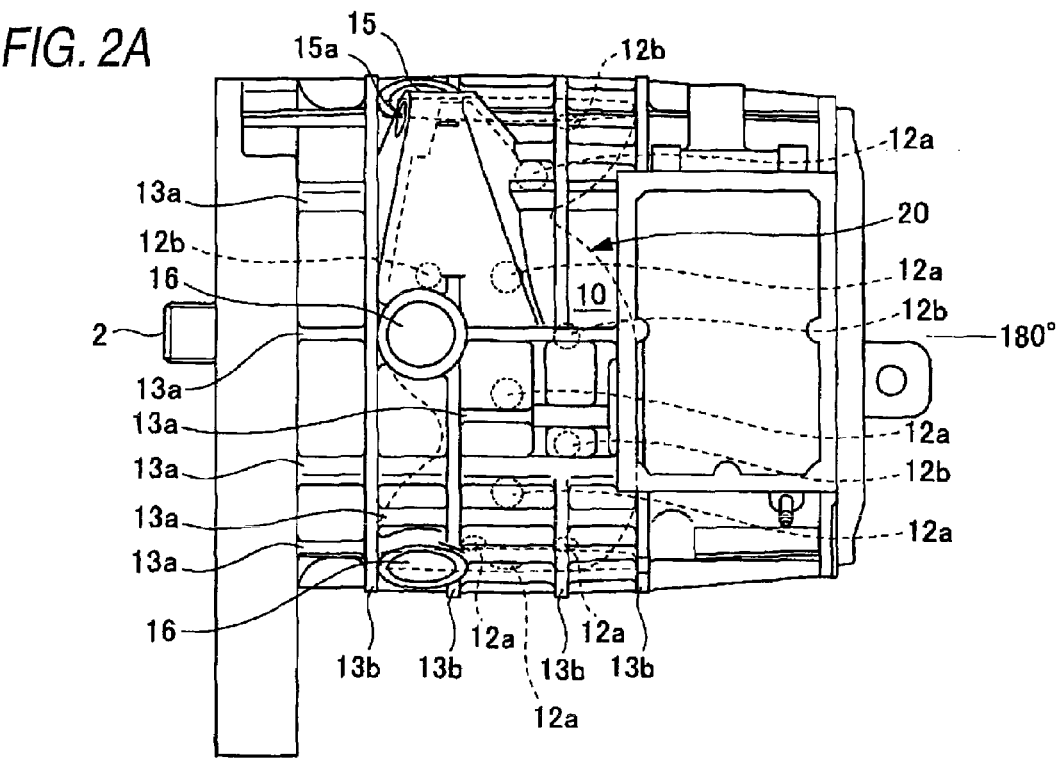
FIGS. 2A and 2B are diagrams showing a relationship between an external appearance and an interior flow path of the electric motor shown in FIGS. 1A and 1B.
Figure 2B:
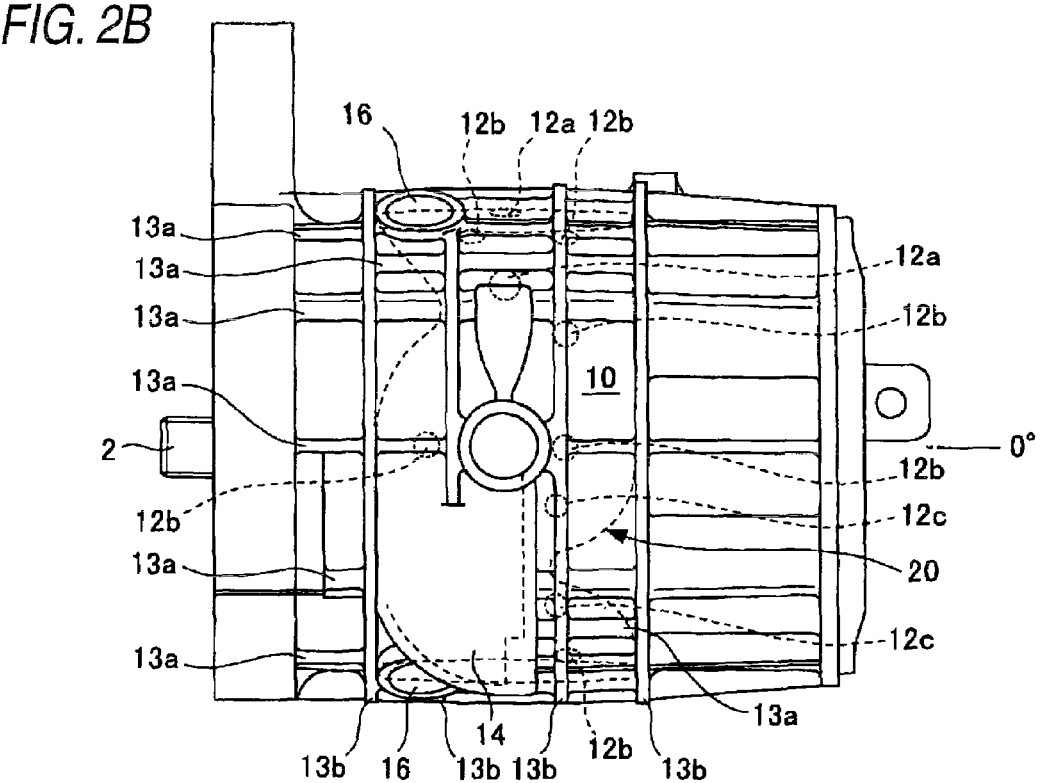
Figure 3A:
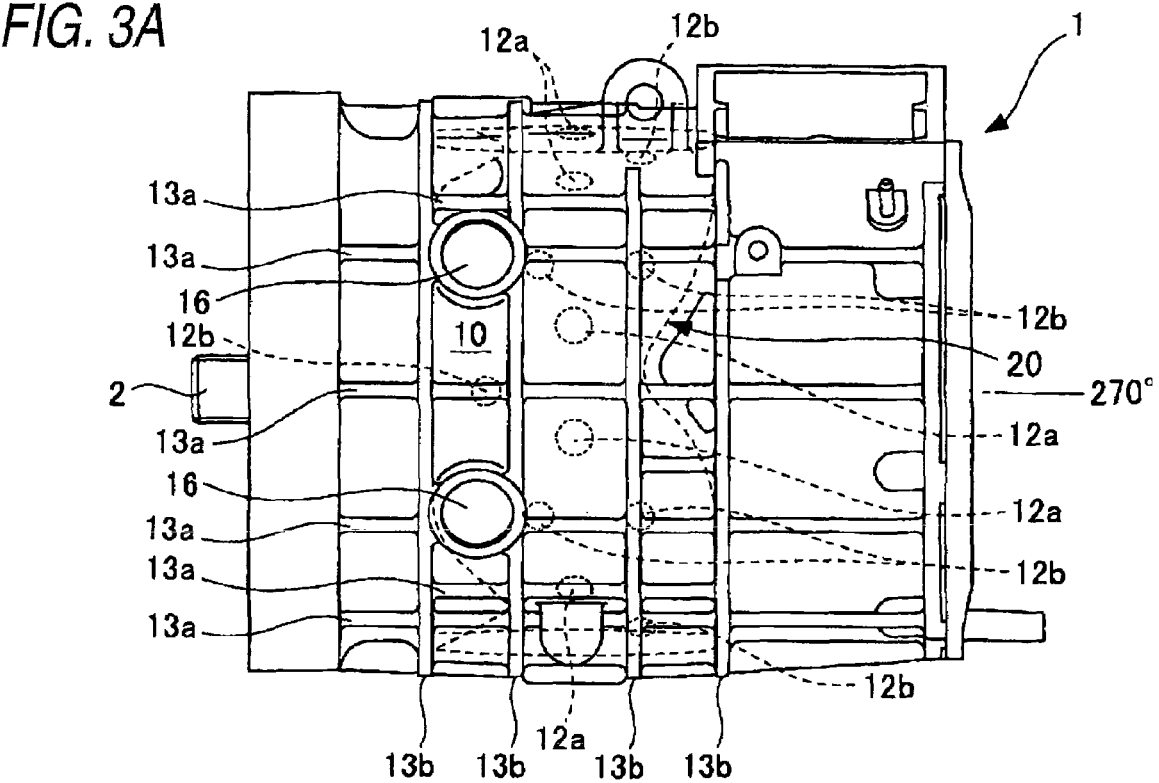
FIGS. 3A and 3B are diagrams showing a relationship between the external appearance and the interior flow path of the electric motor shown in FIGS. 1A and 1B.
Figure 3B:
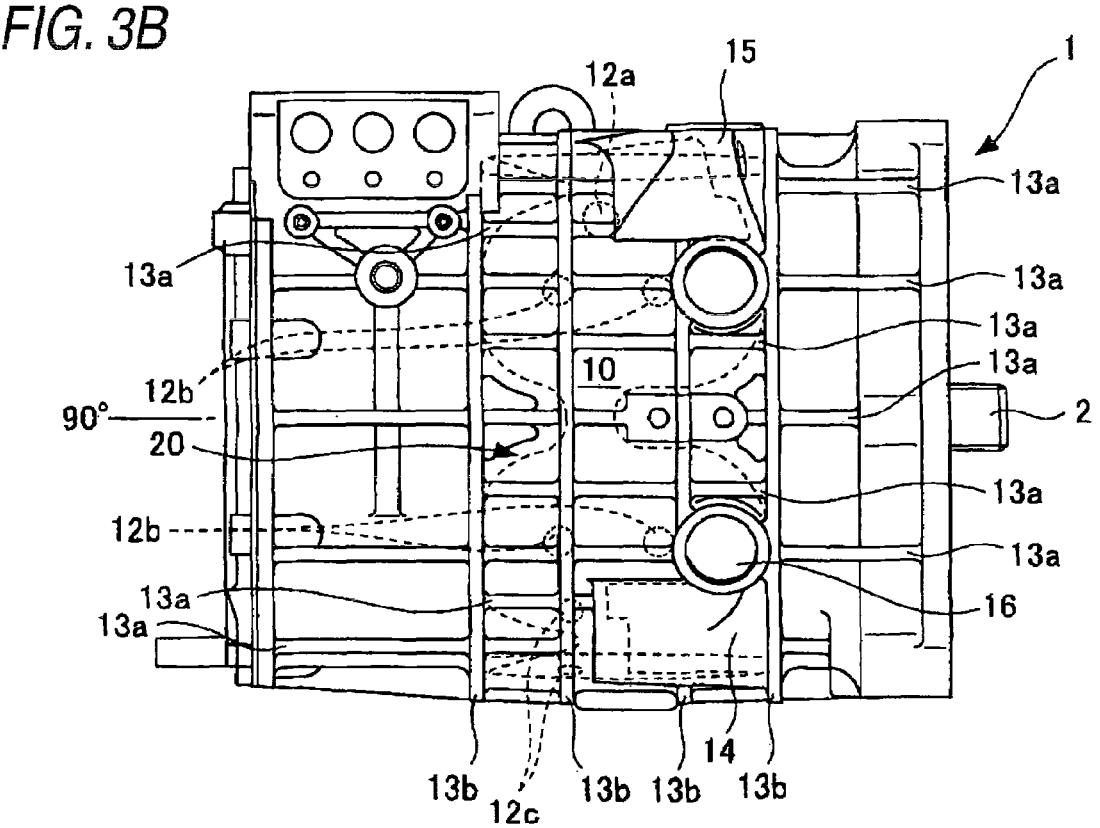
Figure 4:
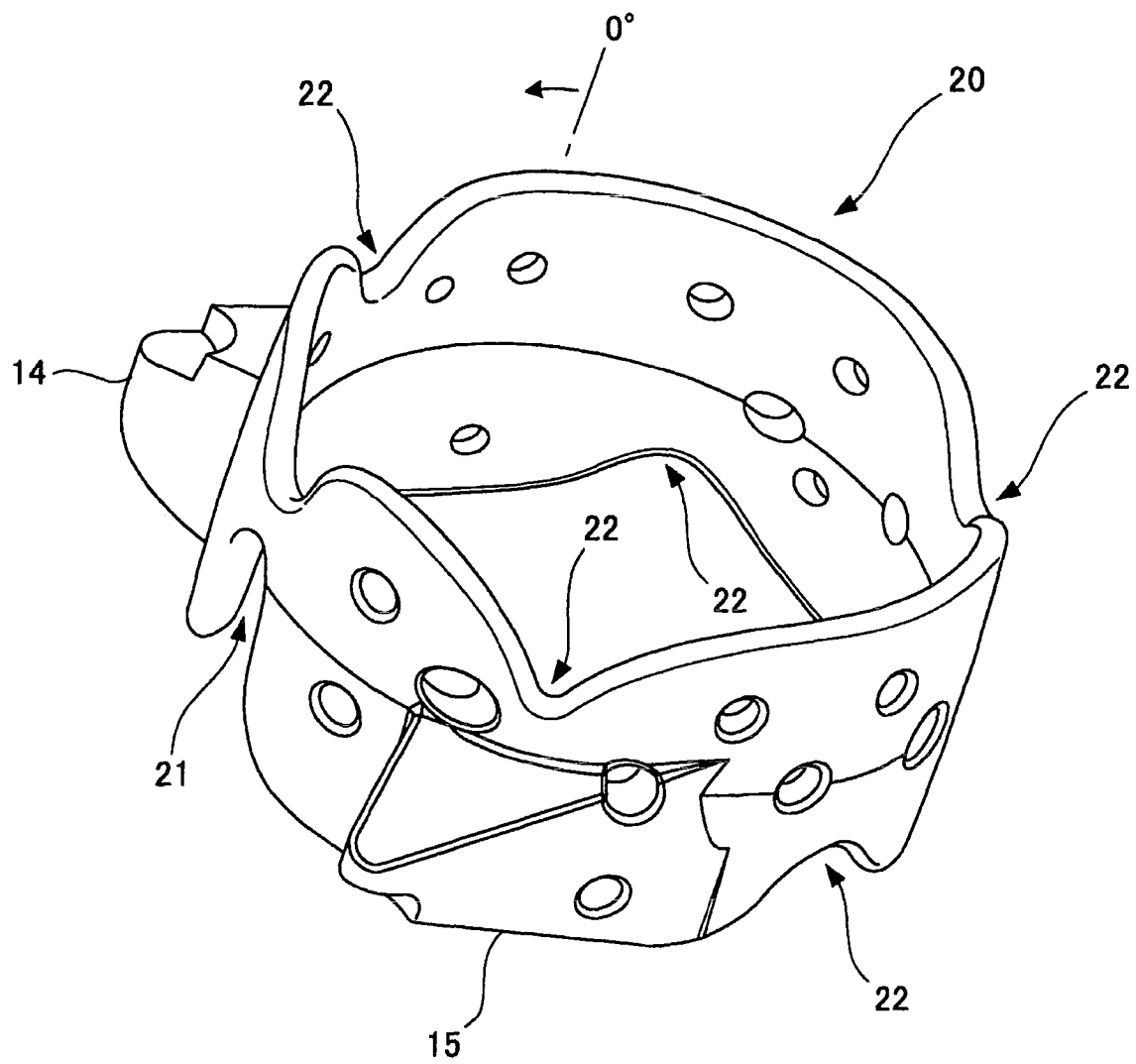
FIG. 4 is a perspective view showing a configuration of the flow path in an interior of the electric motor shown in FIGS. 1A to 3B.

In addition, FIGS. 2A to 3B are diagrams showing a relationship between an external appearance and an interior flow path of the motor 1 shown in FIGS. 1A and 1B, FIG. 2A is an external view of the motor shown in FIG. 1A as viewed from thereabove, FIG. 2B is an external view of the same motor in FIG. 1A as viewed from therebelow, FIG. 3A is an external view of the same motor in FIG. 1A as viewed from the left and FIG. 3B is an external view of the same motor in FIG. 1A as viewed from the right. FIG. 4 is a perspective view showing a configuration of the flow path 20 in an interior of the motor shown in FIGS. 1A to 3B, and FIG. 5 is a development of the flow path 20 shown in FIG. 4 in which the flow path is deployed from 0° in a direction indicated by an arrow.

In the motor 1 of the embodiment, the large number of columns 12a, 12b, 12c are disposed in the flow path 20 which is defined between the inner housing 10 and the outer housing 11, and the inner housing 10 and the outer housing 11 are connected together by these columns 12a, 12b, 12c. As a result, the rigidity of the inner housing 10 is increased by the rigidity of the outer housing 11 which is connected thereto by the columns 12a, 12b, 12c, whereby the high-frequency vibration of the stator 6 is suppressed by both the inner housing 10 and the outer housing 11. Further, the plurality of axial ribs 13a and the plurality of circumferential ribs 13b are provided on the outer circumference of the outer housing 11, so as to increase further the rigidity of the outer housing 11 itself, so that the rigidity of the inner housing 10 is also increased further, whereby the high-frequency vibration of the stator 6 is suppressed further. Note that increasing the rigidities of the inner housing 10 and the outer housing 11 means increasing the natural frequencies thereof, in the event that the natural frequencies of the inner housing 10 and the outer housing 11 are increased to a region where they do not resonate with the high-frequency vibrations of the stator 6, a reduction in vibration noise can be realized.

Figure 5:
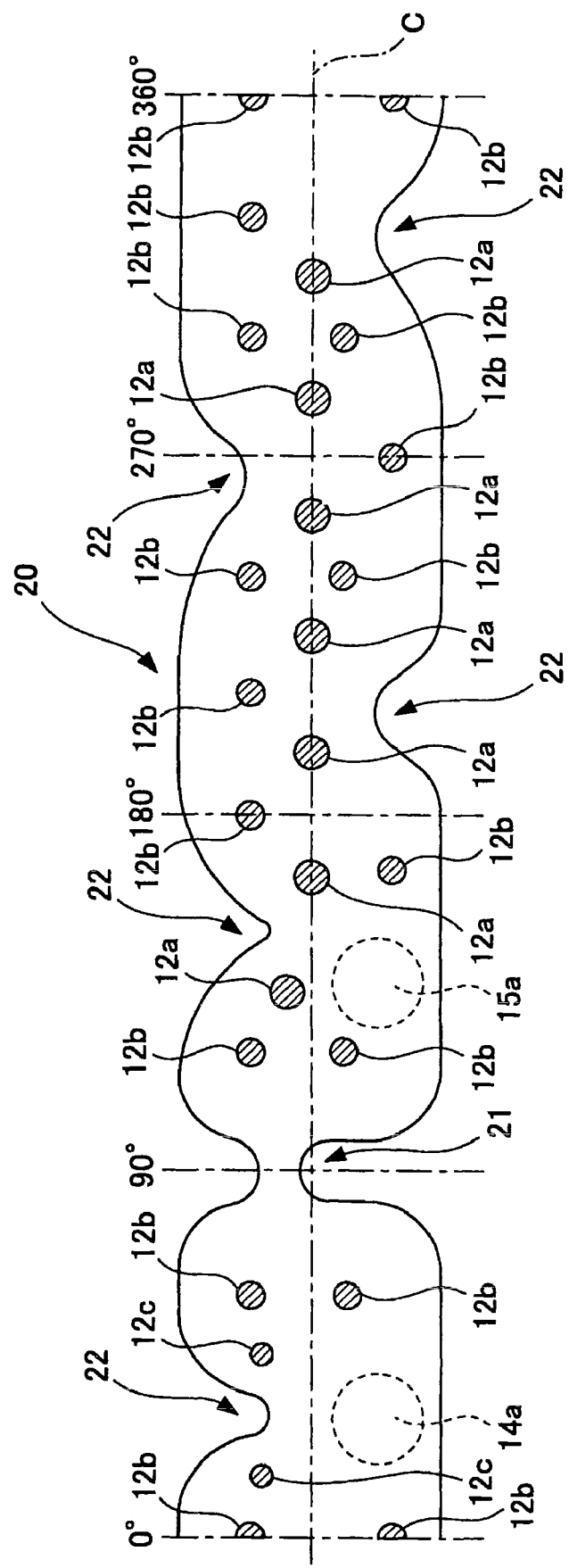
FIG. 5 is a development of the flow path in the interior of the electric motor shown in FIG. 4.

In this way, by the inner housing 10 and the outer housing 11 being connected together by the large number of columns 12a, 12b, 12c, the rigidity of the inner housing 10 can be increased. In the motor 1 of the embodiment, however, a further increase in rigidity of the inner housing 10 is realized by devising disposing positions of the columns 12a, 12b, 12c. Referring to FIG. 5, although the columns 12a, 12b, 12c look as if they were disposed at random, basically, the columns are disposed based on the following rule.

Specifically, the columns 12b are basically disposed in positions which lie directly below at least one of the axial ribs 13a and the circumferential ribs 13b, and when circumstances require, the columns 12b are disposed in positions which lie in the vicinity of at least one of the axial ribs 13a and the circumferential ribs 13b or in positions which lie directly below intersecting portions between the axial ribs 13a and the circumferential ribs 13b. The ribs 12b are made to have an outside diameter of the order of twice the widths of the axial ribs 13a and the circumferential ribs 13b, and based on the outside diameter of the columns 12b, the outside diameters of the columns 12a and the columns 12c are set larger and smaller than the outside diameter of the columns 12b, respectively.

In addition, although the columns 12c are also disposed in positions which lie directly below at least one of the axial ribs 13a and the circumferential ribs 13b, the outside diameter of the columns 12c is smaller than that of the columns 12b. This is because the inlet portion 14 resides in the vicinity thereof and the columns 12c do not constitute resistance to a flow of cooling water supplied from the inlet port 14a. However, the outside diameter of the columns 12c is larger than the widths of the axial ribs 13a and the circumferential ribs 13b. Note that since in the event that there are provided any columns directly below the inlet port 14a and the outlet port 15a, a pressure loss is increased, no columns are provided in those portions (refer to FIG. 5).

On the other hand, the columns 12a are disposed in positions which lie directly below centers of portions which are surrounded by the axial ribs 13a and the circumferential ribs 13b. This is because in a case where the areas of the portions which are surrounded by the axial ribs 13a and the circumferential ribs 13b are wide, there is a fear that membrane vibration is generated. Consequently, in the event that the portions which are surrounded by the axial ribs 13a and the circumferential ribs 13b have such an area that causes membrane vibration, the columns 12a, whose outside diameter is larger than that of the columns 12b, are disposed in positions which lie directly below the centers of the portions surrounded by the axial ribs 13a and the circumferential ribs 13b, that is, in positions where the rigidity is predicted to be reduced. By this configuration, the rigidity of the portions which are surrounded by the axial ribs 13a and the circumferential ribs 13b can be increased, so as to suppress the membrane vibration. Note that in this embodiment, in many cases, the columns 12a redisposed on a center line C of the development shown in FIG. 5.

Figure 6:
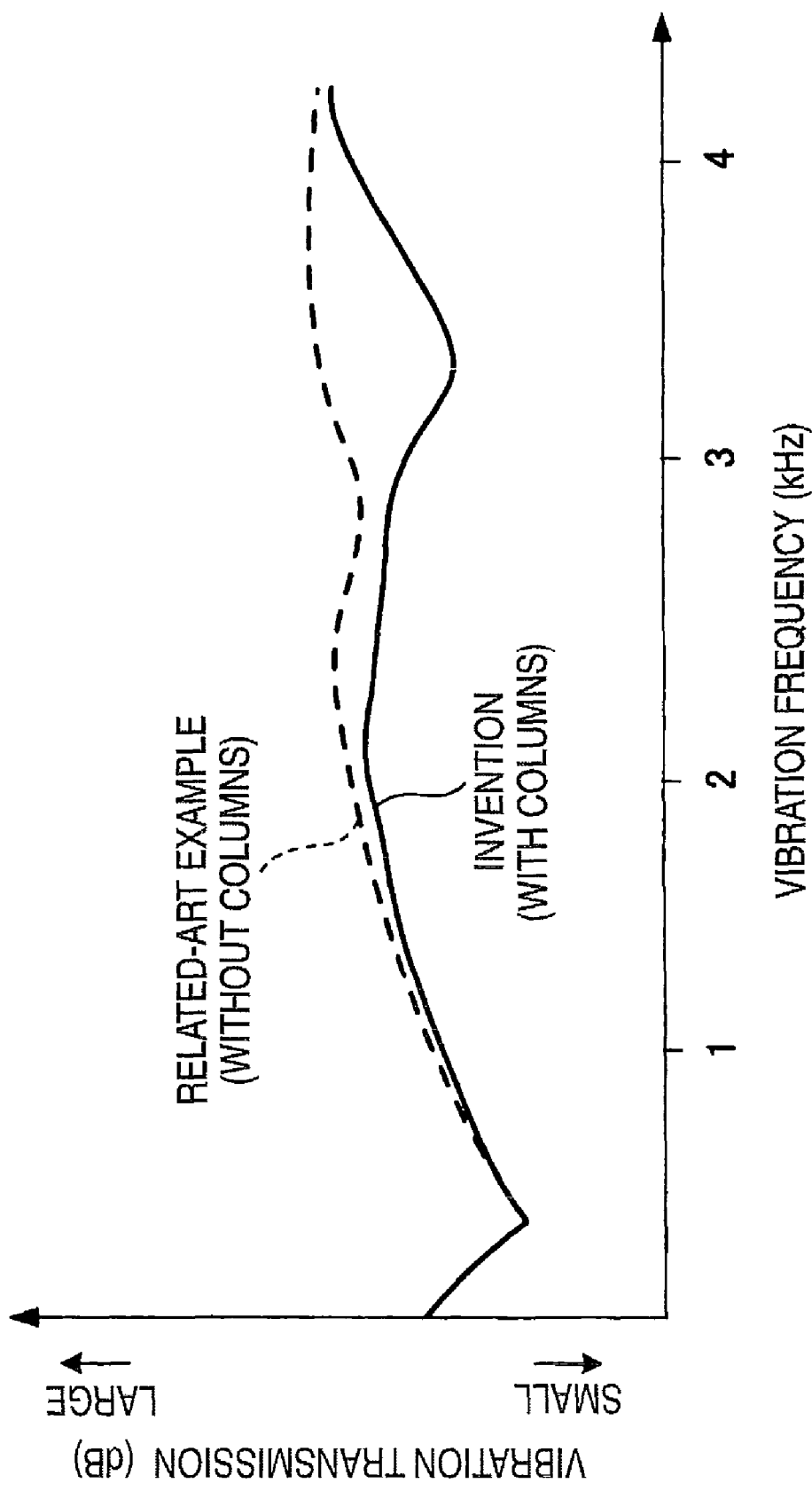
FIG. 6 is a graph showing a relationship of magnitude of transmission of vibration relative to vibration frequency between a related-art example (without columns) and the invention (with columns).

In this way, by the columns 12b, 12c being disposed directly below or in the vicinity of the axial ribs 13a and the circumferential ribs 13b, the columns 12b, 12c are made to be joined to the axial ribs 13a and the circumferential ribs 13b, and the columns 12a are disposed at the portions where the rigidity is predicted to be reduced. By adopting this configuration, the rigidity of an overall motor case including the inner housing 10 and the outer housing 11 can be increased further. Consequently, although also in the motor 1 of the embodiment, high-frequency vibrations are radially transmitted to the inner housing 10 and the outer housing 11 from the stator 6 which functions as the source of vibratory force, since the rigidity of the overall motor case is high, as is shown in FIG. 6, it could be confirmed that high-frequency vibrations could be dampened remarkably in vibration frequencies exceeding 2 kHz. In addition, FIG. 6 shows in a graph the magnitude of transmission of vibration relative to vibration frequency between a related-art example (without columns) and the invention (with columns).

In addition, in the motor 1 of the embodiment, in addition to the increase in rigidity, a device is also made to realize an increase in cooling efficiency.

Specifically, the aforesaid columns 12a, 12b, 12c function not only to increase the rigidity of the motor case but also generate turbulent flows so as to increase heat transfer coefficient. This is because although in the event that there is stagnation in a flow of cooling water, heat stays or is confined in the motor case, whereby the heat transfer coefficient to cooling water is reduced, since turbulent flows (Karman vortexes) are produced on the peripheries of the columns 12a, 12b, 12c, the stirring action is promoted by these turbulent flows so produced, so as to reduce the stagnation of cooling water, whereby the heat transfer coefficient from the stator 6 to the cooling water can be increased. In the motor 1 of the embodiment, since the large number of columns 12a, 12b, 12c are disposed, many turbulent flows are produced, the stirring action is promoted largely, so as to increase the heat transfer coefficient, thereby making it possible to increase the cooling performance of the motor 1 itself.

In addition, orifice portions 21 which narrow the width of the flow path 20 are formed between the inlet port 14a (the inlet portion 14) and the outlet port 15a (the outlet portion 15), whereby the short-circuit of cooling water supplied from the inlet port 14a is suppressed so that the cooling water so supplied is not discharged directly from the outlet port 15a. The orifice portions 21 are formed in such a manner that a rate of direct flow to back flow (flow on a short-circuit side) becomes 7 to 3.

In addition, although recessed portions 22 are portions formed for fixing members and wiring members of the motor 1 to be disposed, in addition to functioning so, the recessed portions 22 also function to generate turbulent flows in the flow of cooling water which flows on both sides of the flow path 20 so as to reduce the stagnation of cooling water to thereby increase the heat transfer coefficient.

In addition, FIG. 4 is a perspective view showing the configuration of the flow path 20 in the interior of the motor 1 as it is removed therefrom, and the configuration of the flow path 20 corresponds to a core configuration in casting a motor case part of the motor 1. For example, in the electric motor described in JP-A-8-19218, unless the thickness of the core configuration is made thick, it becomes difficult to cast the thin elongated cooling fins, and this inevitably increases the outside diameter of the motor case. In contrast to this, in the motor 1 of the embodiment, since the circular cylindrical columns only have to be cast, the thickness of the core configuration does not have to be increased, and hence, there is no such situation that the outside diameter of the motor case is increased, and there is also no such situation that an increase in weight is called for. In this way, in the motor 1 of the embodiment, the core configuration in casting is taken into consideration, whereby it becomes easy to fabricate the motor case of the motor 1, which contributes largely to mass production of motor cases.

According to an aspect of the invention, since the plurality of columns are disposed in the space defined between the inner housing and the outer housing, so that the inner housing and the outer housing are connected together by these columns, the rigidities of the inner housing and the outer housing can be increased without increasing the overall dimensions of the motor case and calling for almost any increase in weight. As a result, a remarkable damping effect can be exhibited in vibration frequency of several kHz, and the increase in cooling efficiency can be realized by turbulent flows produced by the large number of columns.

The electric motor according to the invention is suitable for use in electric vehicles.

What is claimed is:

1. An electric motor for use in an electric vehicle, the electric motor comprising:
    an inner housing which holds a stator; and
    an outer housing which through which cooling water is caused to flow, defined between the inner housing and itself, wherein
    the inner housing and the outer housing are connected by a plurality of columns disposed in the space,
    a plurality of first ribs which extend in an axial direction and a plurality of second ribs which extend in a circumferential direction are provided on an outer circumferential surface of the outer housing, and
    at least first one of the plurality of columns is disposed in a position which corresponds to a position at which one of the plurality of first ribs and one of the plurality of second ribs intersect with each other.

2. The electric motor as set forth in claim 1, wherein
    at least second one of the plurality of columns is disposed in a position which corresponds to one of the plurality of first ribs and the plurality of second ribs.

3. The electric motor as set forth in claim 2, wherein
    at least third one of the plurality of columns is disposed in a position which corresponds to a center of a portion surrounded by the plurality of first ribs and the plurality of second ribs.

4. The electric motor as set forth in claim 3, wherein
    the portion surrounded by the plurality of first ribs and the plurality of second ribs has an area which can generate membrane vibration.

* * * * *